L. C. McCARTNEY.
STOCK FOUNTAIN.
APPLICATION FILED JAN. 24, 1919.
1,309,208.
Patented July 8, 1919.
2 SHEETS—SHEET 1.
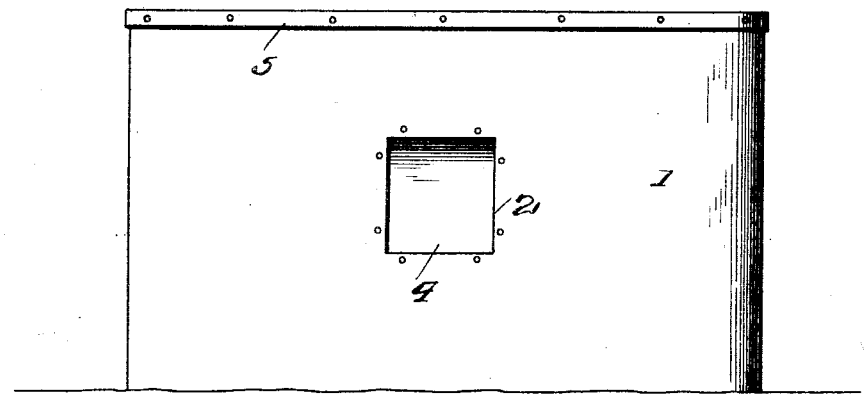
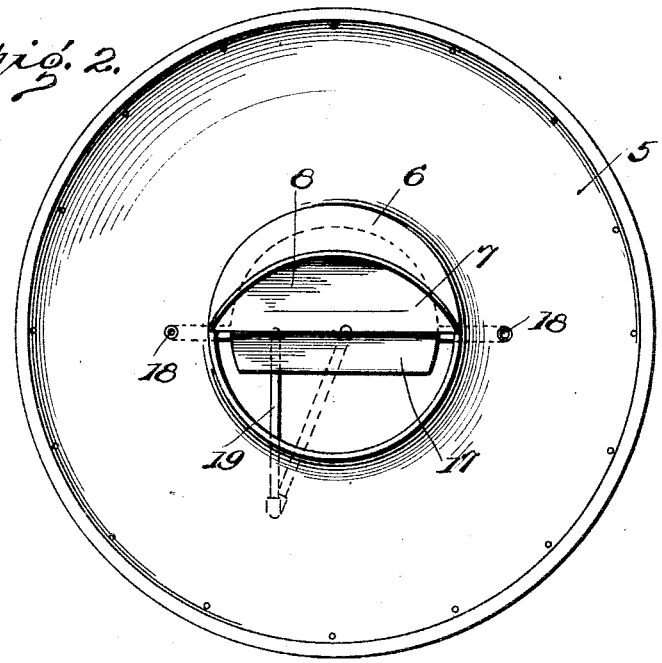
Inventor
L. C. McCartney,
By
Lacey & Lacey, Attorneys

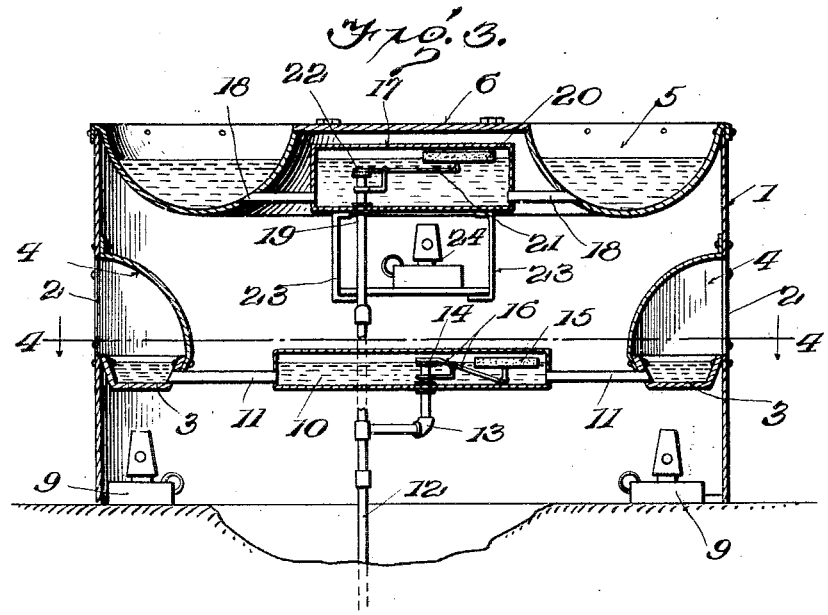
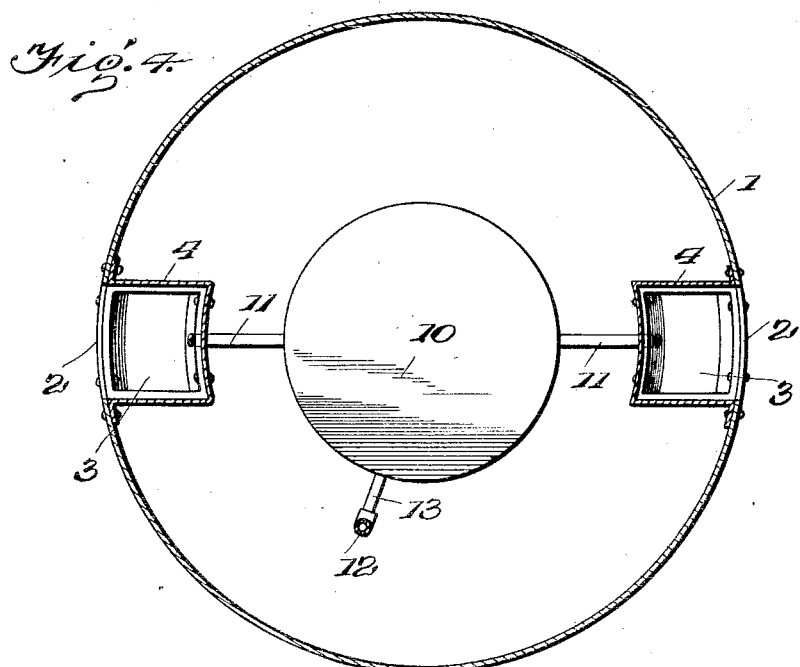

UNITED STATES PATENT OFFICE.

LESLIE CAIUS McCARTNEY, OF LINCOLN, NEBRASKA.

STOCK-FOUNTAIN.

1,309,208.     Specification of Letters Patent.     Patented July 8, 1919.

Application filed January 24, 1919. Serial No. 272,877.

*To all whom it may concern:*

Be it known that I, LESLIE CAIUS McCARTNEY, a citizen of the United States, residing at Lincoln, in the county of Lancaster and State of Nebraska, have invented certain new and useful Improvements in Stock-Fountains, of which the following is a specification.

This invention relates to stock watering fountains and has for its object the provision of a simple and compact apparatus by the use of which large and small animals may be watered and a constant supply of water at the proper temperature for drinking be automatically maintained.

The invention is illustrated in the accompanying drawings and consists in certain novel features which will be hereinafter first fully described and then more particularly pointed out in the appended claims.

In the drawings:

Figure 1 is an elevation of a stock watering apparatus embodying my invention,

Fig. 2 is a plan view with the cover for the central compartment raised,

Fig. 3 is a diametrical section,

Fig. 4 is a horizontal section on the line 4—4 of Fig. 3.

In carrying out my invention, I employ a casing 1 which is preferably cylindrical and is intended to rest directly on the ground. In the wall of this casing are openings 2 and within the casing at each opening is a trough 3 having flaring walls. A hood 4 rises from the sides and back of the trough and is secured to the casing around the opening 2, the hood supporting the trough. The trough 3 may be of cast-iron but the other parts of the apparatus will preferably be of sheet steel. In the upper end of the casing is an annular trough 5 which has its outer edge secured directly to the upper end of the wall of the casing while the inner edge of the trough supports a cover 6, one-half of which may be hinged so as to swing, said swinging portion of the cover being indicated by the reference numeral 8 and shown in its raised position in Fig. 2. Access through the top of the apparatus to the interior mechanism and the heaters 9 is thus easily had and the entrance of dirt or other accumulations to the interior of the apparatus is prevented.

Disposed within the casing, in the horizontal plane of the troughs 3, is a tank 10 which is closed on all sides except as water pipes enter or leave the same. Pipes 11 have their ends secured in the side wall of the tank and the inner wall of the troughs, respectively, and serve not only as outlets through which the water may pass from the tank to the troughs but also as supports to maintain the tank in proper position within the casing. A supply pipe 12 may lead from any source of supply and rises within the casing as shown in Fig. 3. A branch 13 leads from the supply pipe into the tank 10 and at the end of said branch is a valve 14 controlled by a float 15 mounted within the tank and connected with the valve by a lever 16 which is suitably fulcrumed within the tank. It will be readily understood that as the water is drawn from the trough by the drinking animals the level of the water will drop in the tank and, consequently, the float will descend and thereby actuate the lever 16 so as to open the cut-off valve 14. As the water flows into the trough and rises therein it will, of course, simultaneously rise within the tank and the float will be returned to its normal level so that a reverse impulse will be transferred to the cut-off valve and the same closed.

Within the casing is an upper tank 17 which is supported and connected with the trough 5 by outlet pipes 18 extending from the tank to the trough, as shown and as will be readily understood. The supply pipe 12 passes upwardly beyond the branch 13 and enters the tank 17, as shown at 19. A float 20 is mounted within the tank 17 and is connected by a lever 21 with a cut-off valve 22 controlling the end of the pipe 19, as shown and in the same manner as the float 15 and valve 14 control the flow through the branch pipe 13.

Brackets 23 depend from the tank 17 and support a lamp or similar heater 24, the heat from which plays on the bottom of the tank so that the water therein will be prevented from freezing and will be maintained at the proper temperature for drinking.

It is thought the operation and advantages of my improved fountain will be readily understood from what has been said. The larger animals will drink from the upper trough 5 and as the water is drawn from said trough the float 20 will drop so that the valve 22 will be opened and a fresh supply of water permitted to escape from the supply pipe. As the level of water in the trough again rises the float will ascend and close the valve so as to shut off the inflow of water, a constant supply of water being maintained in the trough automatically without any waste of the same. It will be readily noted that the casing of my apparatus incloses all the parts except the upper trough and that all the troughs are readily accessible so that the larger and smaller animals may drink without any trouble and overflow and waste of the water will be prevented. While a sufficient supply of water is had at all times, there is no great volume of water within the casing at any one time so that in the event of damage to any of the mechanism no appreciable time will be lost in draining the tanks. The heat from the several lamps or other heating mediums may circulate freely around the troughs and both tanks so that the danger of the water freezing will be overcome. The working mechanism is composed of very few parts which are of very simple construction and consequently the cost of manufacture and installation will be very slight. The working parts are all inclosed so that they are not apt to be damaged by the stock or by chance blows from passing objects and the operativeness of the device will be maintained constantly.

Having thus described my invention, what is claimed as new is:

1. An apparatus for the purpose set forth comprising a casing, having an opening in its side, a trough having its outer side resting on the lower wall of said opening, a hood secured to the casing above the opening and secured to and supporting the ends and the inner side of said trough, an upper annular trough secured upon the upper end of the casing and disposed at the inner side of the same, a cover connecting the inner wall of said annular trough, tanks within the casing, outlet pipes establishing communication between the tanks and the respectively adjacent troughs and supporting the tanks from the troughs, and means within the tanks for automatically controlling the flow of water therethrough.

2. An apparatus for the purpose set forth comprising a casing, a trough disposed within and supported by the wall of the casing, an annular trough secured in the upper end of the casing, a closure carried by the inner wall of the said trough and covering the space defined by said wall, a tank disposed concentric with said upper trough, outlet pipes supporting said tank from the trough and establishing communication between the same, a heater supported on the under side of said tank, a second tank disposed adjacent the lower trough, an outlet pipe connecting said tank with said trough and establishing communication between the same, a supply pipe entering both tanks, and float-controlled cut-off valves within the tanks for automatically controlling the flow from said pipe.

In testimony whereof I affix my signature.

LESLIE CAIUS McCARTNEY. [L. S.]

Copies of this patent may be obtained for five cents each, by addressing the "Commissioner of Patents, Washington, D. C."